United States Patent
Carignan

[11] 3,771,390
[45] Nov. 13, 1973

[54] AUTOMATED APPARATUS FOR MACHINING PARTS ON A ROTATABLE ARBOR
[75] Inventor: Lucien W. Carignan, Warwick, R.I.
[73] Assignee: New England Malleable Iron Company, Warwick, R.I.
[22] Filed: Dec. 10, 1971
[21] Appl. No.: 206,622

[52] U.S. Cl. .................................. 82/2.5, 82/2.7
[51] Int. Cl. ............................................ B23b 13/00
[58] Field of Search ...................... 82/2.5, 2.7, 101, 82/102; 72/427; 10/107

[56] References Cited
UNITED STATES PATENTS
| | | | |
|---|---|---|---|
| 1,841,988 | 1/1932 | Smith et al. | 82/2.7 |
| 1,946,429 | 2/1934 | Smith et al. | 82/2.7 |
| 1,981,260 | 11/1934 | Yayer | 82/2.5 |
| 2,369,963 | 2/1945 | Gleason | 82/2.5 |
| 3,600,985 | 8/1971 | Carignan | 82/2.5 |

*Primary Examiner*—Andrew R. Juhasz
*Assistant Examiner*—Leon Gilden
*Attorney*—Herbert B. Barlow et al.

[57] ABSTRACT

An automated machine having a rotatable arbor upon which parts are placed prior to advancing a cutting tool against a surface of the part. A first spindle is attached to one end of the arbor and a second spindle having a tubular length surrounds the first spindle. A cone pulley is keyed to the outer surface of the second spindle and it is rotatably driven by a belt connected to a drive motor. Formed on the outer surface of the first spindle are a plurality of recesses each having a number of bores formed in their bottom surfaces. Coil springs are mounted in each of the bores and a block of laminated phenolic material rests atop said springs whereby said springs maintain said block in frictional engagement with the inner hollow surface of the second spindle. The plate and springs thus act as a clutch between the two spindles. Mounted near the opposite end of the first spindle is a brake disc which rotates with the first spindle. The friction facings of the brakes are non-rotatably supported on the shaft of the first spindle. After the brakes are actuated to stop the rotation of the first spindle, the end of the first spindle is gripped by ejection means which draws the arbor into the tubular section of the second spindle and thus ejects the part positioned on the arbor after it has been machined.

6 Claims, 5 Drawing Figures

PATENTED NOV 13 1973
3,771,390
SHEET 1 OF 2
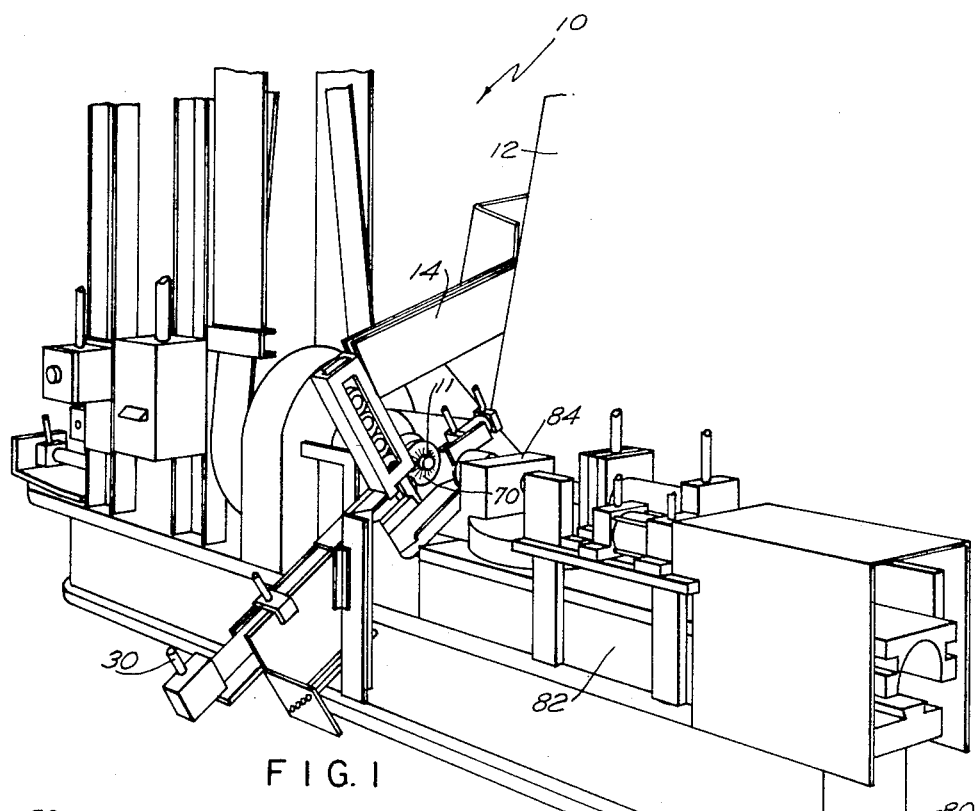
FIG. 1
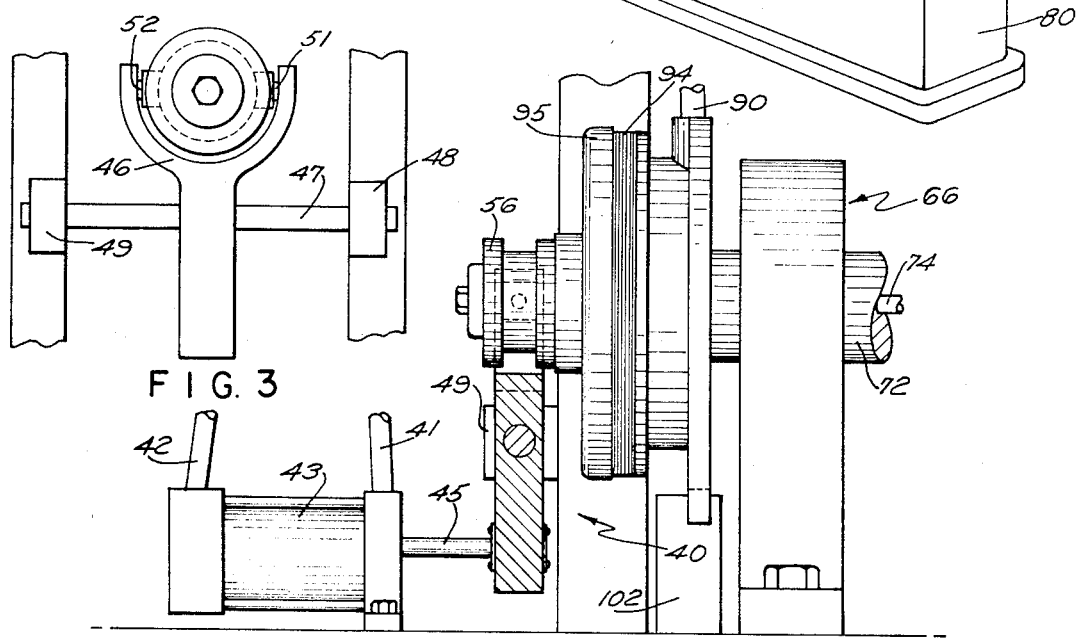
FIG. 3
FIG. 2

AUTOMATED APPARATUS FOR MACHINING PARTS ON A ROTATABLE ARBOR

BACKGROUND OF THE INVENTION

The invention relates to a machine having a rotatable arbor upon which parts are placed to have one of its surfaces machined by a cutting tool advanced against the surface of the part. The particular application in which the machine is illustrated involves machining end surfaces of pipe coupling unions although it is to be clearly understood that the machine could be utilized to machine many other different types of parts requiring a similar surface finishing operation.

In the past the individual parts of a pipe coupling unit have had their various surfaces machined on machines requiring both manual loading and unloading of the part being machined. Also it was necessary to change the direction of rotation of the arbor during the unloading operation. Typically the old operation required a part to be hand placed on the arbor after which a clutch was engaged to rotate the arbor in a first direction. At approximately the same time a cutting tool was advanced a predetermined amount against the surface of the part being finished. Following this it was necessary to de-clutch the drive means from the spindle and also apply a brake to stop rotation of the spindle. Next the machined part was manually gripped and removed from the arbor by reversing the rotation of the spindle which involved a second clutching and de-clutching operation from the drive means. With the cycle having been completed, the operation would begin again by manually placing a second part on the arbor.

SUMMARY OF THE INVENTION

Applicant's novel apparatus for machining parts on a rotatable arbor now allows the drive spindle to continuously rotate in the same direction while one part after another is automatically fed onto and then ejected from the arbor. The time consuming operation of clutching and de-clutching to reverse rotation of the arbor has been eliminated. Presently parts to be machined are automatically fed one after another to a position immediately in front of the retracted arbor. At this time the outer spindle is continuously being rotated. Immediately before the arbor is retracted, brakes are actuated against the brake disc mounted on the inner spindle thus stopping rotation of the inner spindle and the arbor attached at its tip. As a new piece to be machined is positioned in front of the retracted spindle, the brake is disengaged and the inner spindle is moved axially, thus inserting the arbor into the piece to be machined. When the brake is disengaged, clutch means between the outer surface of the inner spindle and the inner surface of the outer spindle engage to rotate the arbor with the work piece thereon. The machine is set up with a cutting tool programmed to move against the piece to be machined a predetermined amount and then withdraw to its original position. After the machining operation has been completed, the cycle is completed by the withdrawal of the arbor which ejects the work piece therefrom.

An object of the invention is to eliminate the time consuming operation of reversing the rotation of an arbor having a part machined thereon.

Another object of the invention is to produce a machine capable of machining parts on a rotatable arbor which is much faster in completing its cycle and much more economical.

A further object of the invention is to produce a machine capable of machining parts on a rotatable arbor which is completely automated from its loading operation through its ejection of the machined part.

An additional object of the invention is to produce a machine having an arbor upon which the parts to be machined are placed which requires the arbor and drive spindle to rotate in only one direction.

DESCRIPTION OF THE DRAWINGS

FIG. 1 is a perspective view of applicant's invention;

FIG. 2 is a partial side elevation view illustrating the ejection mechanism;

FIG. 3 is a partial end elevation view illustrating part of the ejection mechanism;

DESCRIPTION OF THE PREFERRED EMBODIMENT

Applicant's invention is directed to an automated apparatus having a rotatable arbor upon which parts are machined. The apparatus is generally designated numeral 10. To describe the operation of the invention, a specific application will be utilized. In this conjunction the machining of the end surfaces of pipe coupling unions parts will be described although it is to be clearly understood that the machine can be utilized to machine any number of different types of parts requiring a similar surface finishing operation.

Figure 5:
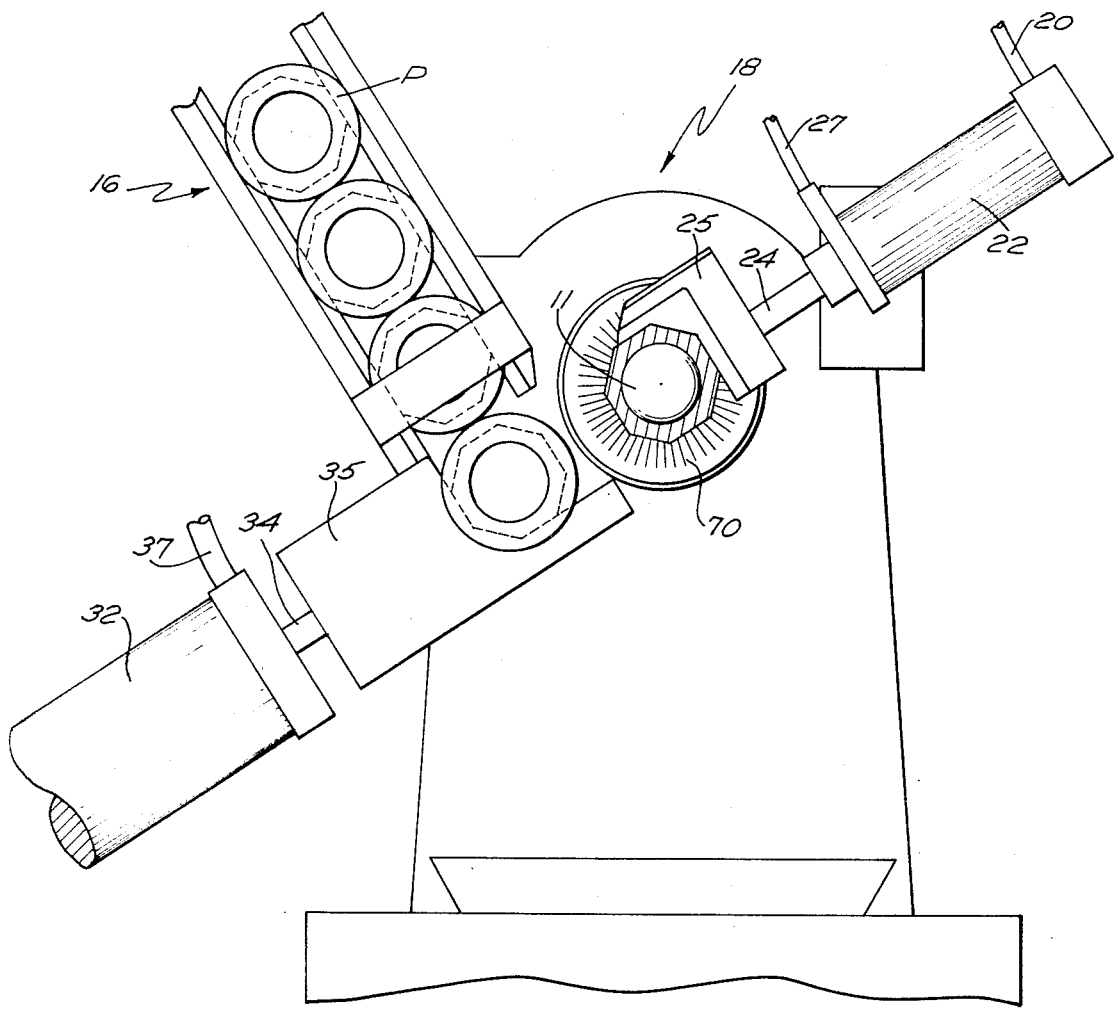
FIG. 5 is an enlarged front elevation view of the automatic feed system.

The first step of the automated operation takes place at a bin (not shown) where the conveyor loading mechanism 12 is filled with cast iron pipe coupling union parts. The conveyor loading mechanism continually passes through this filled bin of parts to maintain a steady supply for the automatic feed system. The conveyor loading mechanism delivers the pipe coupling parts to a transfer chute 14. The parts travel through chute 14 by gravity over to gravity feed chute 16 which is part of the automatic feed system 18. An enlarged view is illustrated in FIG. 5 showing the pipe coupling work pieces P and the manner in which they are positioned in front of the retracted arbor.

Next a complete cycle involving the machining of one pipe coupling part will be described starting with the loading of a work piece P on the arbor. The arbor is then in its retracted position and the previously machined part P has just been ejected. An electrical signal first actuates air valves which release air through hoses 20 and 30 into air cylinders 22 and 32 respectively. This causes pistons within these cylinders to drive piston rods 24 and 34 toward each other with feed hand 35 carrying a work piece to be machined upwardly to a position immediately in front of the retracted arbor. The positioning hand 25 mounted on piston rod 24 is driven forward to cooperate in holding the work piece P in its proper alignment.

Figure 4:
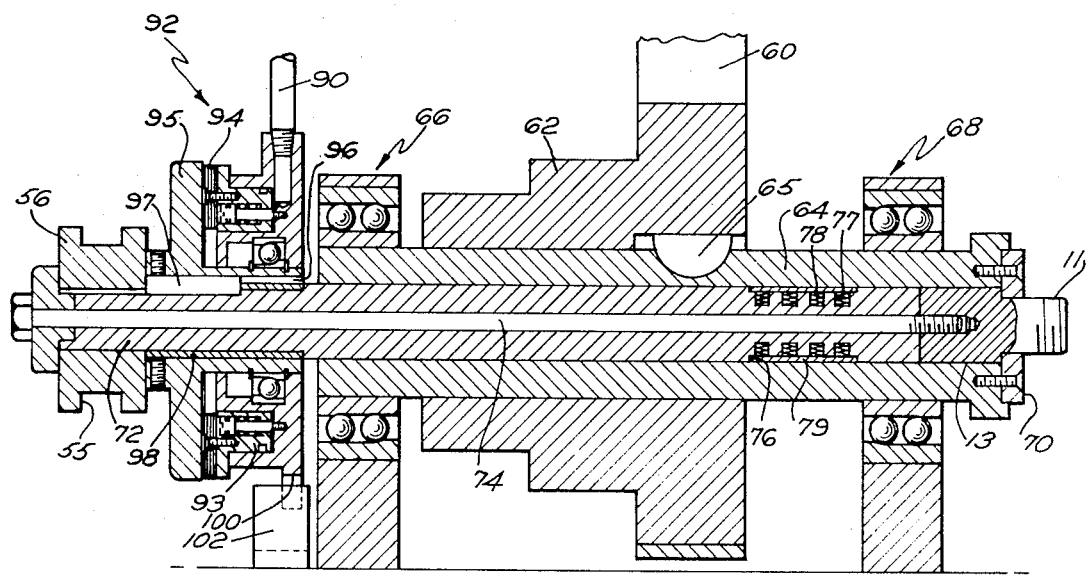
FIG. 4 is a partial cross section of applicant's invention.

Continuing with the operation the brake mechanism (which will be described later) is released and the arbor is moved axially into the bore of the work piece P. Referring to FIGS. 2, 3 and 4 this operation will be described. As the brake is released, the ejection mechanism 40 is put into operation by a sequentially time electrical signal which opens a valve releasing air through tube 41 to drive the piston in air cylinder 43 toward the left as seen in FIG. 2. Piston rod 45 is secured to the bottom of bifurcated yoke 46 thus causing the yoke to pivot about axle 47 which is journalled in mounting brackets 48 and 49. The arms of the bifurcated yoke 46 have inwardly extending fingers 51 and 52 which engage the annular groove 55 of sleeve 56. The movement of the arms of the bifurcated yoke toward the right, as seen in the figures, thus causes the arbor 11 to be shifted axially to the right and into the bore of the work piece.

The drive system will now be described in order to properly understand how the arbor is rotated. A motor, not shown, transmits rotational movement through belt 60 to cone pulley 62. The cone pulley is mounted on outer spindle 64 and rigidly locked thereto by key 65. In operation the belt is continually being driven in one direction thus causing the outer spindle 64 to rotate continuously. The outer spindle 64 is mounted in support bearings 66 and 68 and has a disc 70 whose face is serrated mounted on its end face. It is through this disc that the arbor is retracted during the ejection of a finished machine part P. Within outer spindle 64 is an inner spindle 72. A bolt 74 passes through the bore of spindle 72 and is connected to the shank 13 of arbor 11. Formed on the outer surface of inner spindle 72 are a plurality of recesses 76 each having a plurality of bores 77 along their bottom inner surface. Mounted within these bores are coil springs 78 which bear outwardly upon plates 79. The plates 79 are made from a material, such as a laminated phenolic material, and they act as clutch plates as they are pressed against the inner tubular surface of outer spindle 64. It is thus seen that as outer spindle 64 is rotating this movement is transmitted through the clutch mechanism just described to give a rotational movement to arbor 11. This rotational movement is effectively in operation as the arbor is being axially moved into the bore of the next work piece to be machined. Threads on the outer surface of the arbor frictionally engage the bore surface of the work piece. Additionally the serrated face surface of disc 70 helps to keep the work piece from slipping as its surface is being machined.

Once the arbor has properly engaged the work piece positioned thereon, an electric signal actuates the cutting tool mechanism mounted on base 80. The specific circuitry by which this is done is not considered part of the invention. The signal causes carriage 82 to travel a predetermined distance forwardly toward the rotating part P on the arbor. A cutting tool holder 84 mounted atop the carriage has a cutting tool properly positioned thereon to engage the surface of the part to be machined. After a predetermined amount of metal has been removed, the carriage would automatically be returned to the right to its original position to await the machining of the next part placed on the arbor.

At the moment the machining of the part has been finished, a signal is transmitted to a valve which releases air through air hose 90 connected to the brake mechanism 92. The air released into the brake mechanism causes the pistons 93 to be displaced toward the left causing the friction facings 94 to engage the brake disc 95. The brake disc is mounted on inner spindle 72 in the following manner. Disc 95 has a radial key slot 96 along its bore which mates with a key slot in bushing 98 and also a groove in the outer surface of spindle 72.

A key 97 is inserted in these aligned slots and grooves such that the brake disc 95 rotates in conjunction with the inner spindle 72. That portion of the brake mechanism housing the pistons and friction facings does not, however, rotate since its casing has a radial recess 100 along its bottom peripheral flange which is engaged by a finger or tongue 102 extending upwardly from the base of the machine. The finger or tongue prevents rotation of the basic brake mechanism. It is thus seen that as the friction facings 94 are advanced to engage disc 95, inner spindle 72 will be stopped from rotating as the plates 79 of the clutching mechanism are caused to slip over the inner surface of the spindle 64 as it continues to rotate. During the few brief moments that the inner spindle is not rotating, the ejection mechanism partially described previously is actuated by an electrical signal that opens a valve to release air through air tube 42. The piston in air cylinder 43 is thus forced toward the right as seen in the figure causing the fingers on the bifurcated yoke 46 to withdraw the inner spindle axially to the left and into the bore of the outer spindle and disc 70. It is this operation which ejects the part P which has had its surface already machined and the cycle is ready to begin again by a signal to the automatic feed system already described earlier which would place a new part P immediately in front of the arbor. It will be readily apparent from the foregoing description and by reference to the drawings and in particular to FIGS. 4 and 5 that if the arbor 11 is threaded as illustrated in FIG. 4 and if the parts P are also threaded a unique arrangement is provided. Beginning at the start of operations and assuming that we have righthand threads on the arbor 11 and a counterclockwise rotation thereof as viewed in FIG. 5, it will be apparent that the part P will be threaded onto the arbor 11 coming up snugly against the disc 70 which is part of the outer spindle 64. After machining has been accomplished and the arbor 11 in rotation has been stopped, by virtue of the fact that the outer spindle 64 and the disc 70 are still rotating counterclockwise and are engaged with the part P, it will be apparent that they will automatically unthread the part P from the arbor 11. Thus with this sequence of operations the utility of this device is enhanced when threaded parts are operated on and additional operations of the arbor gripping the part are eliminated.

I claim:

1. Apparatus for machining parts on a rotatable arbor comprising an arbor, a first spindle attached to one end of said arbor, a second spindle having a tubular length that surrounds said first spindle, means connected to said second spindle to rotate it, clutch means releasably connecting said first spindle and said second spindle whereby when said second spindle is rotated the first spindle is normally rotated along with the second spindle, means for moving said first spindle axially within said second spindle whereby a part mounted on the tip of the arbor may be automatically ejected when the arbor is pulled into the tubular end of the second arbor, a brake disc mounted on said first spindle so that they rotate in unison and brake means which are non-rotatable so that when the brake means is actuated the first spindle stops rotating and the second spindle continues to rotate.

2. Apparatus for machining parts on a rotatable arbor as recited in claim 1 wherein said clutch means releasably connecting said first spindle to said second spindle comprises resiliently mounted friction means.

3. Apparatus for machining parts on a rotatable arbor as recited in claim 2 wherein said resiliently mounted friction means comprise at least one recess in the outer surface of said first spindle, a plurality of bores in said recess with a coiled spring mounted in each bore and a block mounted atop said springs whereby said springs maintain said block in frictional engagement with the inner hollow surface of the second spindle.

4. Apparatus for machining parts on a rotatable arbor as recited in claim 1 further comprising reciprocally mounted cutting tool means aligned with said arbor whereby a part mounted on said arbor may have one of its surfaces machined by advancing the cutting tool means as the part is being rotated.

5. Apparatus for machining parts on a rotatable arbor as recited in claim 1 further comprising a disc having an aperture formed in its central area of a sufficient size to allow the tip of the arbor to pass therethrough, one face of the disc being attached to the second spindle so that they rotate together and the opposite face of the disc having a roughened surface means to frictionally engage the lead surface of a part placed on the arbor.

6. Apparatus for machining parts on a rotatable arbor as recited in claim 1 further comprising means for automatically feeding parts on said arbor.

* * * * *